(No Model.)
S. B. COBB.
INSULATING TUBE FOR ELECTRIC WIRES.
No. 330,874. Patented Nov. 24, 1885.
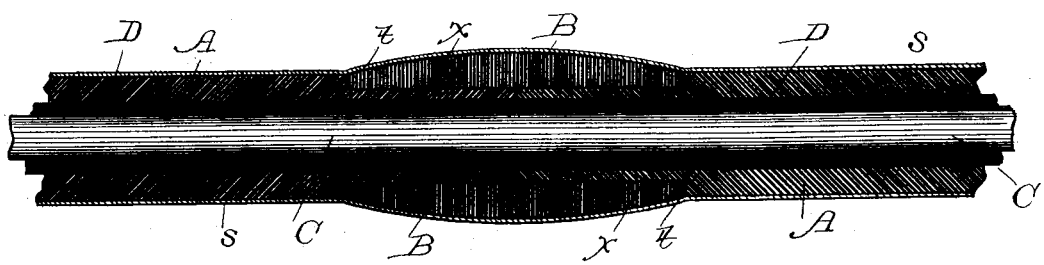
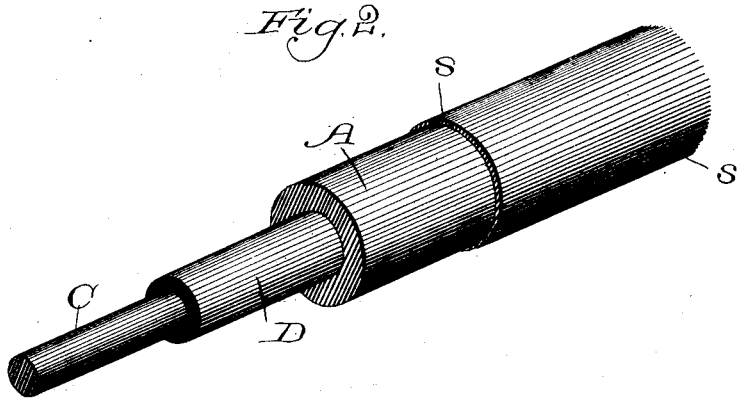

UNITED STATES PATENT OFFICE.

SAM B. COBB, OF CHICAGO, ILLINOIS, ASSIGNOR TO HENRY B. COBB, OF WILMINGTON, DELAWARE.

INSULATING-TUBE FOR ELECTRIC WIRES.

SPECIFICATION forming part of Letters Patent No. 330,874, dated November 24, 1885.

Application filed February 14, 1885. Serial No. 155,885. (No model.)

*To all whom it may concern:*

Be it known that I, SAM B. COBB, a citizen of the United States, residing at Chicago, in the county of Cook and State of Illinois, have invented a certain new and useful Improvement in Insulating-Tubes for Electric Wires; and I hereby declare the following to be a full, clear, and exact description of the same.

My invention relates to an improvement upon the invention for which Letters Patent of the United States, No. 288,310, were granted to Henry B. Cobb, November 13, 1883, for an improvement upon a system of laying subterranean lines of electric wires; and it relates particularly to the construction of the joint for connecting the sections of tubing and to additional means for assisting in and assuring the production of a desired degree of insulation.

In preparing great lengths of the tubing (which, as stated in the aforesaid Letters Patent, is composed of insulating material, and preferably of hard rubber) and inclosing therein electric wire by stringing sections of the tubing upon the wire and joining the sections together (such being the preferred manner of preparing desired lengths for practical use in applying the system) great difficulty was encountered in making joints for connecting the sections of tubing which would be sufficiently tight to stand the water-test to which the tubing, to prove the merits of its insulating properties upon the incased wire, was from time to time subjected, and in preventing access to the wire, through possible transverse minute holes in the tubing and metallic coating thereon, of air and moisture. One way of overcoming this difficulty, by which it is believed a higher degree of insulation than has ever before been attained has been provided for electric wires, is to incase them within tubes of insulating material formed necessarily in comparatively short sections and united by means of suitable joints, and provide the whole with a close covering of metal, continued from section to section over the joints, as described and claimed in an application by Henry B. Cobb, of even date herewith, Serial No. 155,887, for a patent for an improvement in insulating-tubing for electric wires; but it is found that still higher insulation is attained by filling the space within the tubing around the wire which is incased therein with an insoluble plastic substance that will not absorb moisture, and which may also be used with advantage where the metallic coating of the sections of tubing is not continued over the joints which unite them.

My invention comprises the means of effecting the insulation of electric wire hereinafter described and claimed, and illustrated in the accompanying drawings, in which—

Figure 1 shows in longitudinal section two broken sections of tubing formed of insulating material united at their extremities by a ferrule and inclosing an electric wire surrounded by an insoluble plastic filling comprising a substance that will not absorb moisture; and Fig. 2, a perspective view of my improved device, showing the metallic coating, hard-rubber tubing therein, wire within the tubing, and filling around the wire of an insoluble plastic substance that will not absorb moisture.

Each section of tubing A is preferably reduced in diameter toward its extremities, as shown at *x* in Fig. 1 of the drawings, providing shoulders *t*. A ferrule, B, of insulating material is provided having an internal diameter sufficient to permit the ends of the sections of tubing A to enter and fit snugly within it, and of sufficient length to abut at each end against a shoulder, *t*, if provided, of each section of tubing A inserted into opposite ends of the ferrule B when the extremities of the tubing meet midway within the ferrule. The diameter of the ferrule B may be such that its exterior surface shall lie flush with the exterior surface of the sections of tubing A; or it may be greater than that of such sections of tubing, which would, if the latter were not reduced in diameter toward their extremities, necessarily be the case; or it may be, as shown in the drawings, greater than that of the tubing, and tapered toward its extremities to cause the latter to lie flush with the outer surfaces of the sections A. A suitable cement which will not absorb moisture—such as the compound known as "Chatterton's cement"—is preferably applied to the parts of the exterior surfaces of the sections of tubing which enter the ferrule, to assist in firmly securing the latter in place, and to afford additional security against any possibility of a leak in the joint.

C is the wire incased within the united sections of tubing and surrounded by a filling, D, comprising an elastic substance—such as Chatterton's cement—that will not absorb moisture and dissolve. A continuous coating of metal, $s$, is formed, preferably by electro-deposition, over the ferrule and sections of tubing.

Several hundred feet of tubing of the foregoing description joined together by my improved connecting device, and containing electric wire surrounded by a filling of Chatterton's cement between the wire and interior wall of the tubing, have been immersed for seventy-two successive hours in water and subjected from time to time to the test of a galvanometer measuring an insulating capacity of fifty thousand megohms per mile, which failed to indicate even the slightest perceptible variation in the current.

What I claim as new, and desire to secure by Letters Patent, is—

1. In combination with insulating-tube for inclosing electric wire, the device for connecting sections of the said tube together and forming an impervious joint, comprising a ferrule, B, into which the adjacent ends of sections are inserted, and a close and permanent covering of metal formed continuously over the exterior of the tubing and ferrule, substantially as described.

2. Electric wire C, incased within tubing A of insulating material formed in sections, a ferrule, B, into which the adjacent ends of sections of tubing are inserted and thereby united, a filling, D, comprising an insoluble plastic substance that will not absorb moisture, surrounding the said wire within the said tubing, and a close and permanent covering of metal formed over the exterior of the tubing and ferrule, substantially as and for the purpose set forth.

SAM B. COBB.

In presence of—
GEORGE H. MARTZ,
CHARLES MARTZ.